SELECTING FINGER FOR CROSSBAR SWITCH

Filed Nov. 29, 1967 2 Sheets-Sheet 1

SELECTING FINGER FOR CROSSBAR SWITCH

Filed Nov. 29, 1967 2 Sheets-Sheet 2

United States Patent Office 3,497,654

Patented Feb. 24, 1970

3,497,654

SELECTING FINGER FOR CROSSBAR SWITCH

Allan R. Mossberg, Brussels, Belgium, and Charles Vazquez, Paris, France, assignors to International Standard Electric Corporation, New York, N.Y., a corporation of Delaware Filed Nov. 29, 1967, Ser. No. 686,640
Claims priority, application France, Dec. 2, 1966, 85,895
Int. Cl. H01h 3/52
U.S. Cl. 200—166 5 Claims

ABSTRACT OF THE DISCLOSURE

Telephone crossbar switches use short clamped-free wire "finger" springs which are bent against their spring tension to mechanically push a pile-up of leaf springs and thereby close an electrical circuit. When the finger spring is released, it snaps back under its own tension, thereby mechanically releasing the pile-up to open the electrical circuit. As the finger spring moves, it tends to whip about. The invention prevents this whipping by providing a finger spring made from a prestressed coil spring.

Figure 1:
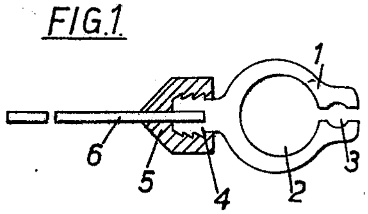

The present invention concerns the crossbar switches and, namely, the auxiliary selection-pieces so-called "selecting fingers" or "cat's whiskers."

It is well-known that the telephone systems of modern conception make use of numerous switches so-called "crossbar switches" wherein connection of a cross-point would result through the successive operation of two bars: one of selection and the other of connection. As concerns more particularly the selection bar, its movements will result into some modifications in the positions of the selecting fingers which it supports, these modifications driving along the positioning of every selecting finger, so that, each one be opposite to a determined spring pile-up of each of the connection bars.

Now then, the selecting fingers must be rigid enough for driving the spring pile-up corresponding to the operated connection-bar and to keep, nevertheless, a flexibility such as to be able to undergo the deformation to which they are submitted when they participate to a connection.

Furthermore, whatever might be the type of selecting finger adopted the same engineering problems are always set, that is to say: the fixing of the selecting fingers on their support; yet the process adopted is to be economical whilst still removing practically the disturbing vibrations.

Up to now, damping is being obtained by means of devices specially studied for absorbing the greatest part of energy dissipated in vibrations. But generally these devices are of relatively expensive manufacture and always necessitate a particular mounting operation which, of course, affects the cost price.

The present invention has for object, therefore, a new type of selecting finger, of economical manufacture, which avoids the disadvantages just mentioned above.

One feature of the invention is a selecting finger for crossbar switches comprising a flexible element made up of a helicoid whose turns, touching each other, have been submitted to a mechanical prestress so as to obtain at the same time, for this selecting finger, the necessary rigidity and flexibility as well as the fast damping of the oscillations, this selecting finger being mounted on the selection bar by any appropriate means.

According to one of the several embodiments of the present invention, another feature is to ensure the fixing of the flexible element upon its support by embedding the adequate part of this support and the flexible element into a sleeve which is obtained by means of an over-casting of some appropriate material, this part comprising an arrangement of teeth so orientated as to prevent withdrawal of this sleeve.

According to another embodiment, a further feature of the invention is that the support-sleeve comprises two openings, one opening serving for its mounting on the intermediate piece which is operated by the selection bar, and the other opening ensuring the housing of the flexible element, this latter opening being extended by a cone-shaped piece gripping around a part of the flexible element, thus, a better damping resulting from such an arrangement.

According to another embodiment, a further feature of the present invention is the fact that the openings existing in the support-sleeve are realized as per a determined angle so as to give, at mounting operation, an inclination which corresponds to the flexible element.

According to another embodiment, a further feature of the invention is the fact that the part of the support meant to receive the flexible element has an exterior bevelled-outline and a central cut-away that serves as a housing to the flexible element, the setting into place of a ring upon this part of the support will first have the ring slide along the bevelled outline, tending progressively to bring together the edges of this central cut-away, then, the ring slides onto the outline bevelled in opposite direction which helps keeping it in place and preventing its involuntary withdrawal.

According to another embodiment, a further feature of the invention is the fact that the flexible element is associated with its support by means of an intermediate piece which has lugs fixing it to said support, two punched lips in this intermediate piece ensuring the holding of the flexible element through the gripping effect they exert because of their flexibility.

According to another embodiment, a further feature of the invention is to realize the fixing of the flexible element by anchoring means, the part of the support meant to receive the flexible element comprises punched parts performed, alternatively, on each of the two sides of the said part as per a certain angle, so as to clear an edge of these punched parts in order to allow the easy insertion of the flexible element between the punched parts, the anchoring being ensured by the housing, between two adjacent turns of the flexible element, of the other edge of the said punched parts.

According to another embodiment, a further feature of the invention is the fact that the flexible element is associated directly with the selection bar by means of a tubular piece which serves for its housing and crosses the said bar, the free part of this piece being flattened in order to make it have a dimension superior to the dimension of the openings existing in the said bar, so as to prevent its involuntary withdrawal.

According to another embodiment, a further feature of the invention is to form two parts in the helicoid of the flexible element, one first part having a diameter in relation with the support into which its turns are screwed, the second part having a different diameter and performing the function of selecting finger properly speaking.

Figure 12:
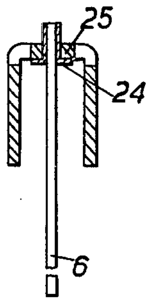
Figure 13:
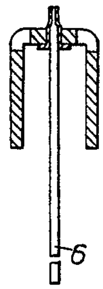
Figure 14:
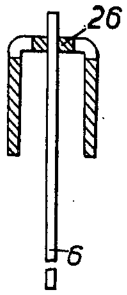
Figure 15:
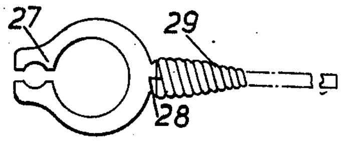
Figure 16:
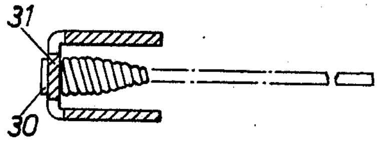

Different other features of the invention will become apparent from the description that follows, given by way of non-limiting example, in conjunction with the accompanying drawings comprising:

FIGURES 1 to 11 and the FIGURE 15, being views of various selecting devices provided for being associated with selecting bars of circular section;

FIGURES 12 to 14 and the FIGURE 16 are views of various selecting devices provided for being associated with selection bars of U section.

Now, begins the description in referring first to FIGURE 1 which comprises, amongst others, a stop ring 1 of a type which is so-called, also, "circlip." An example of the application of such a ring was described in the French patent applications, Ser. No. 1,344,407 and Ser. No. 1,359,728 filed, respectively, on Oct. 16, 1962 under the title: "Outil pour la Mise en Place des Bagues d'Arrêt" and on Feb. 13, 1963 under the title: "Perfectionnements aux Multi-Sélecteurs à Barres Croisées," in the name of the applicant. The present description will therefore limit itself in simply reminding that in this case the opening 2 enables the passing through of a selection bar of circular section when a tool is being operated which has a cone-shaped part that progressively engages itself into the opening 3. The ring 1 comprises a lug 4, the edges of which are machined in such fashion as to present an arrangement of teeth which ensure the holding of a sleeve 5. This latter can be obtained by the over-casting of some plastic material which lets sink a part of the selecting finger 6. This selecting finger is a deformable flexible element in the form of a helicoid with close turns made up of a metal wire of circular section. Such an element has already been described in the French patent, Ser. No. 1,405,332 filed on May 26, 1964, in the name of the applicant and entitled: "Eléments de Contact." For memory's sake it can be reminded here that the turns are submitted to a mechanical pre-stress which ensures the rectitude of the contact element and the rapid damping of the oscillations that might appear on either side of the longitudinal axis of the helicoid. Indeed, the pre-stress affords a certain rigidity to the contact element and thus gives it an additional contact pressure whereas the damping will result from the friction taking place between the turns of the helicoid. It is worth noting that, in the example of FIGURE 1, it is not possible to change the selecting finger without destroying the over-casting 5 which ensures its holding.

Figure 2:
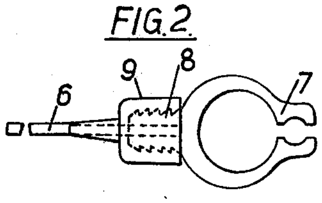
Figure 3:
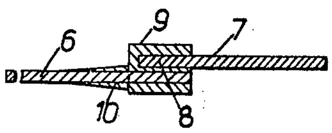

FIGURES 2 and 3 show another embodiment, FIGURE 3 being a side view of FIGURE 2. The stop ring 7 is identical to the one of FIGURE 1, the arrangement of the teeth of the lug 8 determining the holding of the over-casting 9. This latter comprises another opening into which the selecting finger 6 is force-fitted. This opening extends by a cone-shaped piece 10 which serves as additional damper to the selecting finger 6 and can be either integral part of the over-casting 9 or can be cast and then associated with this over-casting by any adequate means. In such an arrangement, it is worth noting that the slant to give to the selecting fingers, in order that they occupy a well-determined rest position when they are mounted on the selection bars, is obtained either in giving to the cone-shaped piece 10 a position corresponding to the required slant, or in realizing as per a given angle the openings provided for the mounting on the lug 8 and for the housing of the selecting finger 6.

Figure 4:
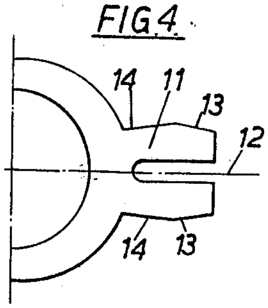

FIGURE 4 is an enlarged view showing the detail of another form of lug 11; support of the selecting finger. This latter has its edges bevelled and comprises a central cut-away 12 meant to receive the selecting finger. Thus, when a ring is slipped on lug 11 it engages first, progressively, on the bevelled parts 13 and causes, consequently, a nearing together of the edges of cut-away 12; this will result into a tightening of the selecting finger when the latter is in place. When the ring is fully engaged, the reverse slant of parts 14 prevent its involuntary withdrawal.

Figure 5:
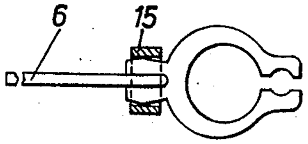

In FIGURE 5, the lug of the ring has the same form as the one in FIGURE 4, the ring 15 ensuring the holding of the selecting finger 6.

Figure 6:
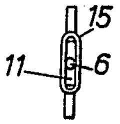

This holding, anyhow, is better illustrated in FIGURE 6 which is a side view of FIGURE 5. The selecting finger 6 has a diameter slightly higher than the thickness of the lug 11 so that the tightening realized by the ring 15 ensures a more efficient holding of the selecting finger.

Figure 7:
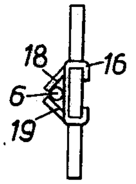
Figure 8:
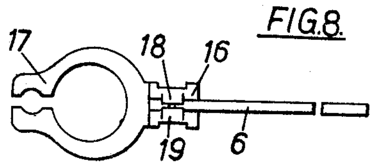

FIGURES 7 and 8 represent, respectively, the side and elevation views of another mode of fixing the selecting finger. A link-piece 16, which has its profile in general form of a C, grips round the lug of stop-ring 17. By means of a punching, lips 18 and 19 are realized in the central part of the link-piece; because of their elastic response, these lips press on the selecting finger and thus ensure its holding.

Figure 9:
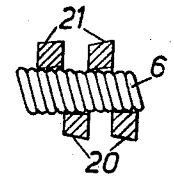
Figure 10:
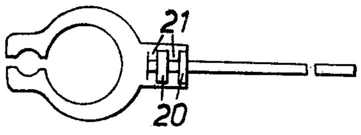

In FIGURES 9 and 10, the fixing of the selecting finger is realized by anchoring means. For doing so, there are formed four punched half-rings, two pairs 20 on one surface, two pairs 21 on the other surface of the stop-ring lug. The punching of these half-rings 20 and 21 is realized in such way that, as shown in FIGURE 9, it should be very easy to insert the selecting finger in between them, but that edge of these half-rings, by catching between two adjacent turns, would prevent any movement of withdrawal and will ensure the anchoring of the selecting finger.

Figure 11:
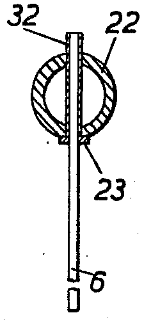

In FIGURE 11, there can be seen a selecting finger mounted directly on a tubular selection bar 22. The selecting finger crosses this bar, housed in an eyelet 23, also tubular, which is flattened in the part 32, exterior to the bar, so as to hold it in place. Such an arrangement does not enable the adjustment of the selecting finger, only the interchangeability is being possible by driving out the eyelet from bar 22.

So far, the descriptions have been referring to elements meant to be associated with cylindrical selection bars. It is nevertheless quite evident that use of the type of selecting finger of the present invention can be made with the U shaped selection bar. FIGURES 12, 13, 14 and 16 show several embodiments.

FIGURE 12 represents an embodiment similar to the one of FIGURE 11. A tubular eyelet 24 ensures the housing of the selecting finger 6. It crosses the thickness of adjustment lug of selecting finger 25 of the selection bar, and its exterior part is flattened out to hold it in place.

FIGURE 13 is a variant of FIGURE 12, the difference lying in the fact that the selecting finger does not take up the entire housing space offered by the eyelet, the free extreme-part situated at the exterior of the lug of the selection bar being flattened out in order to ensure the holding of the eyelet in the lug.

In FIGURE 14, the adjustment lug 26 is perforated so as to allow the passing through of the selecting finger 6. This latter is held in place through crimping obtained by notches realized on both surfaces of the lug 26 in immediate neighborhood of the selecting finger. In this case, the oscillations which originate in the selecting finger, when this latter restores to its rest position after having been solicited in one direction or in the other, are damped less rapidly than if the devices of FIGURES 12 and 13 are being used—the gripping round the selecting finger being less efficient. However, with respect to the system in FIGURE 10, the advantage lies in the possibility of adjustment of the position of the selecting finger by acting upon the lug of the selection bar.

In FIGURE 15, a stop ring 27 is being used whose lug 28 comprises edges provided with teeth which correspond to a thread of determined pitch. The selecting finger 29 is made up of two parts of one same helicoid, whose turns have the pitch of the one of lug 28 so as to be able to be screwed onto the latter. This part, which serves for the mounting, has therefore a bigger diameter than the other one which performs the function of selecting finger properly speaking.

A type of selecting finger of similar profile is used in FIGURE 16. The big diameter part enables the mounting of the selecting finger by having it screwed on screw 30 of the adjustment lug 31, the selection bar being in the shape of a U.

It is understood the foregoing description of specific embodiments of this invention is made by way of example only and is not to be considered as a limitation on its scope.

SUMMARY

The invention is concerned with a selecting finger for a crossbar multiswitch comprising a flexible element constituted by a helicoid whose touching turns have been submitted to a mechanical prestress. Thus are being obtained at the same time, for the selecting finger, the necessary rigidity and flexibility as well as the rapid damping of the oscillations. This selecting finger is mounted on the selection bar by any appropriate means.

We claim:

1. A crossbar select finger comprising a pre-stressed coiled wire spring having the rigidity required to push a leaf spring crosspoint pile up and the flexibility required for non-permanent deformation between operate and release position, and means associated with one end of said pre-stressed coiled wire spring for mounting it on a select bar in a crossbar switch, the other end of said pre-stressed coiled wire spring having freedom of movement, said mounting means comprising an overcast material providing a mechanical stress cone for gradually tapering the flexibility of the finger spring into the rigidity of the mount.

2. The finger spring of claim 1 wherein said mounting means further comprises a support member having said pre-stressed coiled finger spring mounted therein, said mechanical stress cone having a substantial portion of said support member embedded therein, said stress cone further tapering to a contact with said coiled finger springs, and teeth means in said support member for locking said stress cone against withdrawal.

3. The finger spring of claim 2 and ring means slipped along the tapered portion of said stress cone to lock said cone onto said teeth.

4. The finger spring of claim 1 wherein said mechanical stress cone comprises a resilient sleeve between said finger spring and a select bar.

5. The finger spring of claim 1 where the mechanical stress cone is an enlarged part of said pre-stressed coiled spring.

References Cited

UNITED STATES PATENTS

| | | | |
|---|---|---|---|
| 3,123,663 | 3/1964 | Muldoon. | |
| 3,125,706 | 3/1964 | Long | 339—276 |
| 3,150,233 | 9/1964 | Dinger. | |
| 3,165,575 | 1/1965 | Lynch et al. | |
| 3,293,355 | 12/1966 | Gropp et al. | |
| 3,349,167 | 10/1967 | Mixon et al. | 174—94 |
| 3,384,704 | 5/1968 | Vockroth | 174—94 |
| 3,390,370 | 6/1968 | Golankiewicz. | |
| 3,396,257 | 8/1968 | Vazquez. | |

FOREIGN PATENTS

| | | |
|---|---|---|
| 24,085 | 1/1900 | Great Britain. |

HERMAN O. JONES, Primary Examiner

U.S. Cl. X.R.

200—178